United States Patent Office 2,803,683
Patented Aug. 20, 1957

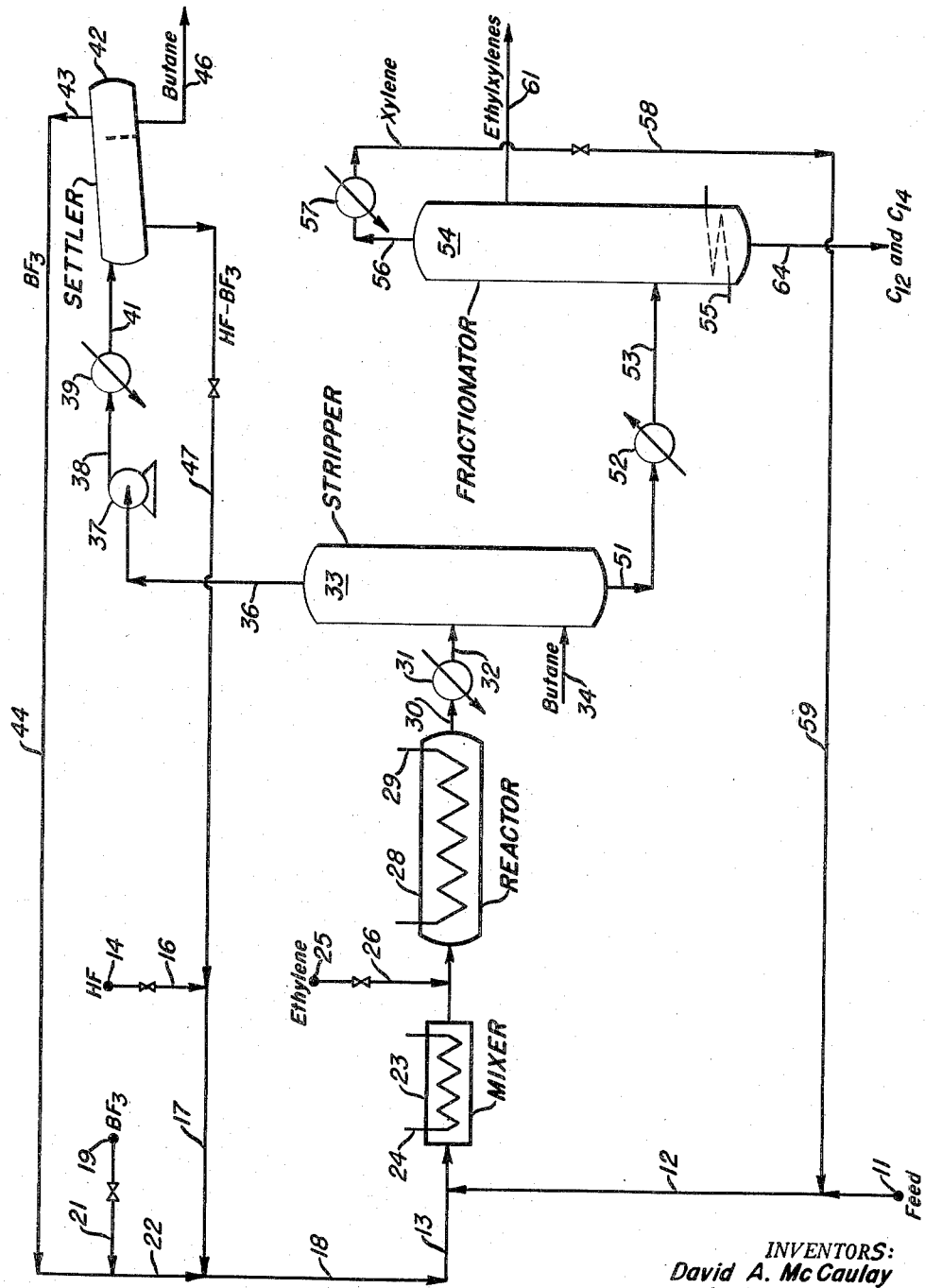

2,803,683

MONO-SEC-ALKYLXYLENES BY ALKYLATION

David A. McCaulay, Chicago, Ill., and Arthur P. Lien, Highland, Ind., assignors to Standard Oil Company, Chicago, Ill., a corporation of Indiana Original application October 26, 1953, Serial No. 388,238, now Patent No. 2,766,307, dated October 9, 1956. Divided and this application February 21, 1956, Serial No. 566,815

8 Claims. (Cl. 260—671)

This invention relates to the preparation of monoalkylxylenes by the reaction of an olefin and xylene. More particularly, the invention relates to the preparation of ethylxylenes. Still more particularly the invention relates to the preparation of the symmetrical 1,3,5-ethylxylene.

This application is a division of our copending application Serial No. 388,238, filed October 26, 1953, now U. S. Patent No. 2,766,307.

The commercial polystyrene resins have the disability of a softening point lower than the boiling point of water. It is known that resins prepared from dimethylstyrene have a softening point higher than the boiling point of water. Ethylxylenes with an ortho arrangement of a methyl and the ethyl group dehydrogenate to methylindenes, which are very difficult to separate from the dimethylstyrene. The methylindenes act as plasticizers and lower the softening point of the polydimethylstyrene; the presence of more than about 6% of these contaminants lowers the softening point of the resin below the boiling point of water. In the prior art processes, this undesirable ortho relationship between a methyl and the alkyl group exists in the major portion of the ethylxylene product.

The development of the hydroperoxide synthesis for phenols has caused a large demand for substituted secondary alkybenzenes. Essentially pure isomers are desired in order to permit the production of phenols of specific characteristics. 1,3,5-isopropylxylene is of particular interest in this synthesis.

It is an object of this invention to alkylate xylenes with olefins to produce preferentially monoalkylxylenes, which contain predominantly 1,3-dimethyl-5-alkylbenzene. Another object of our invention is to produce ethylxylenes containing a predominant amount of 1,3,5-ethylxylene by ethylating xylenes. Still another object is to prepare essentially pure 1,3,5-ethylxylene by ethylating xylenes. A further object is the preparation of 1,3,5-secondary alkylxylenes by alkylating xylene. A particular object is the preparation of 1,3,5-isopropylxylene. Yet another object is the preparation of 1,3,5-tert-butylxylene. Other objects will be apparent in the detailed description.

It has been found that by the use of liquid HF—BF$_3$ catalyst under controlled conditions, each of the xylene isomers or mixtures thereof can be readily alkylated with ethylene, propylene, butene-1, butene-2 and isobutylene to produce preferentially monoalkylxylenes.

The feed to the process comprises any one of the three xylene isomers or mixtures thereof. In the presence of HF—BF$_3$ agent, olefins alkylate benzene and toluene very readily; therefore, the presence of more than appreciable amounts of benzene and toluene should be avoided.

The acid phase can dissolve a fair amount of paraffins, for example, the xylene feed may contain as much as 3 volume percent of paraffins without forming a separate hydrocarbon phase (when at least about 1 mol of BF$_3$ is present per mol of xylene charged). The presence of a hydrocarbon phase, i. e., raffinate phase, as not desirable because some of the xylene is withdrawn from the acid phase and the yield of alkylxylene is decreased and the product distribution is shifted from the desired maximum of 1,3,5-alkylxylene.

Under the conditions of the process, ethylbenzene is rapidly converted to mainly triethylbenzene, ethylxylene, and dialkylethylbenzene. These products boil well above the desired monoalkylxylene and may be separated therefrom by distillation. When the olefin used is ethylene, it may be possible to tolerate large amounts of ethylbenzene in the feed; a suitable feed is the C$_8$ aromatic hydrocarbon fraction obtained by extractive distillation of hydroformate or platformate, i. e., naphtha obtained by the catalytic reforming of virgin naphtha in the presence of hydrogen, which fraction contains about 2–3% of paraffins and slight amounts of olefins and C$_9$ aromatic hydrocarbons.

Liquid xylenes react with BF$_3$ and liquid HF to form a complex containing 1 mol of BF$_3$ per mol of xylene and also, probably, 1 mol of HF per mol of xylene. Alkylxylenes also form a complex with BF$_3$ and HF. These complexes are very soluble in liquid HF. It is necessary in the process that sufficient liquid HF be present to dissolve all the complex formed. The presence of liquid HF in excess of this amount is desirable. Thus the amount of liquid HF should be between about 3 mols per mol of xylene present in the feed and about 50 mols. It is preferred to use between about 5 and 20 mols of liquid HF. Put in another way, the amount of liquid HF used may be between about 100 to about 400 volume percent based on xylene charged.

The process must be carried out under substantially anhydrous conditions. The liquid HF used must be substantially anhydrous, that is, the liquid HF should not contain more than about 2–3% of water.

The amount of BF$_3$ used in the process may range from about 0.1 mol per mol of xylene (a catalytic amount) to about 5 or more mols. When a mixture of alkylxylene isomers is a satisfactory product, at least about 0.4 mol of BF$_3$ per mol of xylene charged should be used.

In order to obtain better yields of alkylate and to obtain a better alkylate product distribution, the process should be operated under conditions wherein essentially all the feed is dissolved into the acid phase. Some BF$_3$ and HF may exist in a separate gaseous phase, but it is preferred to operate at a pressure high enough to dissolve essentially all the BF$_3$ in the acid phase. This essentially single homogeneous phase may be obtained by using at least about 1 mol of BF$_3$ per mol of xylene charged, for example, 0.9 mol.

The production of the desired 1,3,5-alkylxylene is favored by the use of enough BF$_3$ to complex all the xylene in the feed. Thus, it is preferred to use between at least 1 and about 3 mols of BF$_3$ per mol of xylene charged, for example, 1.5 mols.

The alkylation of xylene with olefin, in the presence of HF—BF$_3$ agent, produces a mixture containing xylene, alkylxylene and polyalkylxylene. The polyalkylate yield may be reduced by operating with an excess of xylene over the amount of olefin charged. The mol ratio of xylene to olefin should be at least 1 and a ratio of 20 or more may be used.

With ethylene, it is preferred to use a mol ratio between about 2 and 5, when operating at ordinary atmospheric temperatures, i. e., between about 0° and about +30° C. At higher temperatures, for example, +60° C., the mol ratio may be only slightly in excess of 1, for example, 1.03.

The distribution of alkylxylene isomers and the relative yields of the various alkylate products is dependent upon both the temperature and the time of contacting. It is believed that a mixture of isomers is obtained when the olefin adds to the xylene to form alkylxylene. Following the alkylation reaction, an isomerization reaction occurs in which the 1,3,5-alkylxylene is preferentially formed. Under suitable conditions of time and temperature, essentially all the alkylxylene present in the acid phase will be the 1,3,5-isomer. Shorter contacting times may be used when a high purity 1,3,5-alkylxylene, i. e., about 95%, product fraction is desired.

The permissible temperatures vary markedly with the type of olefin used in the process. The olefins usable in the process are selected from the class consisting of ethylene, propylene, isobutylene, butene-1 and butene-2. The use of pentenes and higher olefins results in excessive side reactions, such as cracking and rearrangement of the alkyl group. In order to set out the relationship of temperature and time to product distribution, the various olefins are discussed in accordance with the individual characteristics of the alkylate products.

Ethylene alkylation

The ethylxylenes undergo cracking reactions and the formation of tars, condensed ring compounds and gases at temperatures above about +135° C. Xylenes undergo a disproportionation reaction at high temperatures. In order to minimize the loss of xylene to trimethylbenzene, the ethylation process should be carried out at a temperature of not more than about +75° C. and preferably below about +65° C.

Low temperatures reduce the rate of formation of 1,3,5-ethylxylene and also affect the rate of alkylation. In general, the contacting time, at a particular temperature, is dependent upon the desired degree of conversion of the ethylxylene fraction to the 1,3,5-ethylxylene isomer. Temperatures as low as −20° C. or lower can be used if the correspondingly longer time of contacting is tolerable; for example, at −20° C., a time of 20 hours should be used. At about +35° C., a suitable reaction time is about 5 minutes. When using higher ratios of xylene to ethylene, the preferred temperature is between about +15° and +35° C., using a time between about 5 minutes and 5 hours, the longer times corresponding to the lower temperatures. Higher temperatures, i. e., +50 to +65° C., have a favorable effect on the yield of ethylxylene at lower xylene to ethylene ratios. Essentially pure 1,3,5-ethylxylene can be produced in very high yield by carrying out the ethylation at about +65° C. for a time of about 10 minutes; at about +50° C., a suitable time is about 30 minutes.

In general, it is preferred to operate with about the minimum contacting time needed to obtain the degree of 1,3,5-ethylxylene readily obtainable at the particular temperature of operation.

Propylene, butene-1 and butene-2 alkylation

The alkylation of xylene with olefins from the class consisting of propylene, butene-1 and butene-2 gives products containing a secondary alkyl group, namely, isopropyl and sec-butyl. These secondary alkylxylenes undergo extensive cracking reactions at temperatures above about +80° C. Condensation reactions proceed to an appreciable extent when long contacting times are used at temperatures of about +40° C. and higher; it is desirable to operate at a temperature of not more than about +40° C.

The secondary alkylxylenes isomerize much more readily than the ethylxylenes; therefore, very low temperatures, such as −20° C., may be employed without having to use extremely long contacting times. At −20° C., high purity 1,3,5-secondary alkylxylene is obtained when using a time of about 2 hours.

As the temperature is raised, the time of contacting is correspondingly decreased. When the temperature of contacting is about +20° C., the contacting time is between about 5 and 20 minutes. At a temperature of +40° C., the time is between about 1 and 5 minutes; at these higher temperatures, the time of contacting should be as short as practicable in order to decrease the yield of side reaction products, i. e., the time should be as close to about 1 minute as equipment limitations will permit.

It is preferred to operate the secondary alkylxylene production process at a temperature between about 0° and +20° C. for a time between about 5 and about 60 minutes, the longer times corresponding to the lower temperatures.

Isobutylene alkylation

The alkylation of xylene with isobutylene gives products containing a tertiary butyl group. These tert-butylxylenes undergo extensive cracking and condensation reactions at temperatures of about +25° C. In order to substantially avoid these side-reactions, the temperature of operation should be maintained below about +15° C. The yield of the desired 1,3,5-tert-butylxylene is improved by operation at temperatures of not more than about 0° C., for example, −20° C. The tert-butyl group is so active that temperatures as low as about −75° C. may be used without requiring extremely long contacting times.

When operating at a temperature of about +15° C., very short contacting times should be used—between about 1 minute and 5 minutes. At 0° C., the contacting time may be between about 5 and 30 minutes. The lower the temperature of contacting, the longer the permissible contacting time, without significant adverse effect on the yield of the 1,3,5-tert-butylxylene.

EXAMPLES

The results obtained by the invention are illustrated by several experimental examples and one using HF alone as the catalyst. The results of these experiments are presented in Tables I and II. In order to illustrate the experimental procedure, runs 5 and 7 are set out in detail below.

*Run 5.*—The runs were carried out in a 1570 ml. carbon steel autoclave fitted with a 1725 R. P. M. stirrer. 3.02 mols of m-xylene were added to the reactor; this was followed by 23 mols of liquid HF (150 volume percent on xylene). BF$_3$ was pressured into the reactor from a small cylinder. A total of 4.5 mols of BF$_3$ were added, which amounted to an uncorrected BF$_3$/xylene ratio of 1.5. At the reaction temperature of +20° C., the pressure in the reactor was 140 p. s. i. a. Taking into account the free space in the reactor, the partial pressure of HF and the solubility of BF$_3$ at this temperature and pressure, the free BF$_3$ was calculated to be about 1.5 mols. Thus the corrected BF$_3$/xylene was 1.0, i. e., the theoretical for the complexing of all the meta-xylene.

Ethylene was added to the contents of the reactor over a period of 5 minutes; 1.21 mols were added for a xylene/ethylene ratio of 2.50. The pressure on the reactor indicated the ethylene was rapidly absorbed. The reactor contents were maintained at 20° C. for 15 minutes. The contents were withdrawn into a Dry Ice cooled flask containing about 70 ml. of water. Insofar as coud be determined by visual observation, only one single phase homogeneous system had existed in the reactor.

The total product distribution in this run was as follows:

| Hydrocarbons | Mols | Percent |
|---|---|---|
| m-xylene | 2.06 | |
| 1,3,5-ethylxylene | .65 | 67.8 |
| 1,3,4-ethylxylene | .02 | 2.0 |
| 1,3,2-ethylxylene | .02 | 2.0 |
| $C_{12}$ aromatics | .27 | 28.2 |
| | | 100.0 |

TABLE I

| Run No | 1 | | 2 | | 3 | | 4 | | 5 | | 6 | | 7 | |
|---|---|---|---|---|---|---|---|---|---|---|---|---|---|---|
| Temperature, °C | +5 | | +5 | | +5 | | +5 | | +20 | | +5 | | +25 | |
| Reaction Time, Minutes | 15 | | 15 | | 15 | | 15 | | 15 | | 15 | | 240 | |
| Reaction Mixture: | | | | | | | | | | | | | | |
| m-Xylene, mols | 3.0 | | 3.0 | | 3.0 | | 3.0 | | 3.02 | | 1.98 | | 2.11 | |
| p-Xylene, mols | | | | | | | | | | | 0.86 | | 0.92 | |
| Ethylbenzene, mols | | | | | | | | | | | 0.16 | | | |
| Ethylene, mols | 2.8 | | 2.7 | | 1.2 | | 1.25 | | 1.21 | | 1.25 | | 1.18 | |
| Xylene/Ethylene, mol ratio | 1.07 | | 1.11 | | 2.50 | | 2.40 | | 2.50 | | [1] 2.40 | | 2.57 | |
| $BF_3$/Xylenes, mol ratio (Uncorr.) | 0 | | 0.75 | | 0.71 | | 1.20 | | 1.50 | | [1] 1.20 | | 1.50 | |
| $BF_3$/Xylenes, mol ratio (Corr.) | 0 | | 0.74 | | 0.70 | | 0.90 | | 1.00 | | 0.87 | | 1.00 | |
| HF/Xylenes, mol ratio | 7.5 | | 7.5 | | 7.5 | | 7.5 | | 7.5 | | 7.5 | | 7.5 | |
| Product Mixture: | Mols | Percent | Mols | Percent | Mols | Percent | Mols | Percent | Mols | Percent | Mols | Percent | Mols | Percent |
| m-Xylene | 1.87 | | 1.23 | | 2.14 | | 2.04 | | 2.06 | | 1.39 | | 1.76 | |
| p-Xylene | | | | | | | | | | | .47 | | .26 | |
| Ethylbenzene | | | | | | | | | | | .08 | | | |
| 1,3,5-Ethylxylene | .03 | 2.5 | .58 | 33.0 | .41 | 45.1 | .51 | 52.0 | .65 | 67.8 | .49 | 45.4 | .72 | 72.7 |
| 1,3,4-Ethylxylene | .47 | 40.5 | .39 | 22.1 | .33 | 35.2 | .21 | 21.4 | .02 | 2.0 | Tr. | | Tr. | |
| 1,3,2-Ethylxylene | .13 | 11.2 | Tr. | | Tr. | | | | .02 | 2.0 | Tr. | | Tr. | |
| 1,4,3-Ethylxylene | .00 | | .00 | | .00 | | .00 | | | | | | .01 | 1.0 |
| $C_{12}$ Aromatics | .17 | 14.7 | .63 | 35.8 | .13 | 14.3 | .22 | 22.5 | .27 | 28.2 | .32 | 29.6 | .26 | 26.3 |
| $C_{14}$ Aromatics | .06 | 5.2 | .16 | 9.1 | .04 | 4.4 | .04 | 4.1 | .00 | | .27 | 25.0 | .00 | |
| $C_{16}$ Aromatics | .30 | 25.9 | .00 | | .00 | | .00 | | .00 | | .00 | | .00 | |
| Distribution of Ethylene in Product (Mol Percent of the Ethylene Feed): | | | | | | | | | | | | | | |
| $C_{10}$ | | 27 | | 36 | | 69 | | 60 | | 56 | | 60 | | 60 |
| $C_{12}$ | | 15 | | 48 | | 24 | | 31 | | 44 | | 40 | | 40 |
| $C_{14}$ | | 7 | | 18 | | 7 | | 9 | | 0 | | 0 | | 0 |
| $C_{16}$ | | 51 | | 0 | | 0 | | 0 | | 0 | | 0 | | 0 |

[1] Total $C_8$ feed.

TABLE II

| Run No | 8 | | 9 | | 10 | | 11 | | 12 | |
|---|---|---|---|---|---|---|---|---|---|---|
| Temperature, °C | +15 | | +60 | | +60 | | +15 | | +5 | |
| Time, Minutes | 15 | | 60 | | 60 | | 15 | | 30 | |
| Reaction Mixture: | | | | | | | | | | |
| m-Xylene, mols | 9.76 | | 3.25 | | 3.28 | | 2.02 | | 2.93 | |
| Ethylene, mols | 5.36 | | 3.83 | | 3.10 | | | | | |
| Propylene, mols | | | | | | | 1.97 | | | |
| Isobutylene, mols | | | | | | | | | 3.0 | |
| Xylene/olefin, mol ratio | 1.82 | | 0.85 | | 1.05 | | 1.03 | | 0.98 | |
| $BF_3$/xylene, mol ratio | 1.60 | | 1.46 | | 1.22 | | 2.18 | | 1.08 | |
| HF/xylene, mol ratio | 9.3 | | 9.2 | | 9.2 | | 17.3 | | 9.6 | |
| Reaction Product Mixture: | Mols | Percent | Mols | Percent | Mols | Percent | Mols | Percent | Mols | Percent |
| m-xylene | 5.87 | | 0.13 | | 0.41 | | 0.60 | | 2.15 | |
| 1,3,5-ethylxylene | | 39.3 | | 78 | | 94 | | | | | |
| 1,3,4-ethylxylene | | 31.5 | | 0 | | 0 | | | | | |
| 1,4,3-ethylxylene | | 7.9 | | 0 | | 0 | | | | | |
| 1,3,5-isopropylxylene | | | | | | | | 81 | | |
| 1,3,5-t-butylxylene | | | | | | | | | | 56 |
| Diethylxylene | | 16.4 | | 17 | | 6 | | | | | |
| Triethylxylene | | 4.9 | | 5 | | ca. 0.5 | | | | | |
| Higher Boiling | | 0.0 | | 0 | | | | 19 | | 44 |
| Percent of theoretical yield of monoalkylate, based on olefin | | | | 72 | | 88 | | | | |

The flask was allowed to warm to room temperature. The contents were transferred to a separating funnel, where the supernatant hydrocarbons—displaced from their complexes by the water—were separated from the aqueous acid phase. The hydrocarbons were washed with dilute aqueous ammonium hydroxide to remove traces of HF and $BF_3$. The hydrocarbons were fractionated through a column of 30 theoretical plates. The distillation separated the product into groups according to number of carbon atoms; the composition of each group was determined by a combination of ultraviolet, and infrared absorption, refractive index, boiling point and specific gravity.

Insofar as the analytical methods used could determine, no hydrocarbons containing more than 12 carbon atoms were present in the product.

The properties of the total ethylxylene product in run 5 and the properties of 1,3,5-ethylxylene as given by Birch et al., JACS, 71, 1362 (April 1949), are:

| | Run 5 | Birch et al |
|---|---|---|
| B. P., °C | 184 | 183.65 |
| $n_D^{20}$ | 1.4980 | 1.4981 |
| Sp. Gr. | 0.865 | 0.8644 |

*Run 7.*—In this run, the feed consisted of 2.11 mols of m-xylene and 0.92 mols of p-xylene. The amount of liquid HF used was 150 volume percent based on total xylene feed. Enough BF$_3$ was added to the reactor to give an uncorrected BF$_3$/total xylene ratio of 1.5. The pressure in the reactor at the reaction temperature of 25° C. was 160 p. s. i. a. The corrected BF$_3$/total xylene was 1.0, i. e., the theoretical for the complexing of both the meta- and para-xylenes.

Ethylene was added to the reactor over a period of 5 minutes; 1.18 mols were added for a total xylene/ethylene ratio of 2.57. The contents of the reactor were maintained at 25° C. for 4 hours. At the end of this time, the contents of the reactor were withdrawn into a Dry-Ice cooled flask containing water. Visual observation of the contents as they were withdrawn indicated the existence of only a single phase homogeneous system.

The reactor contents were handled in the manner described in run 5. The total product distribution in the run was:

| Hydrocarbon | Mols | Percent |
| --- | --- | --- |
| m-xylene | 1.76 | |
| p-xylene | 0.26 | |
| 1,3,5-ethylxylene | 0.72 | 72.7 |
| 1,3,4-ethylxylene | Trace | |
| 1,3,2-ethylxylene | Trace | |
| 1,4,3-ethylxylene | 0.01 | 1.0 |
| C$_{12}$ aromatics | 0.26 | 26.3 |

The properties of the total ethylxylene product in run 7 are:

B. P. ° C _____ 185
$n_D^{20}$ _____ 1.4985
Sp. Gr _____ 0.865

In Table I, run 1 shows the use of liquid HF as the catalyst for the ethylation of meta-xylene. In this run, 58% of the ethylene reacted to form aromatics containing three or four ethyl groups (C$_{14}$ and C$_{16}$ aromatics). Of the ethylxylene produced, almost 80% was 1,3,4-ethylxylene which has a methyl group and the ethyl group in ortho relation. Run 2 is substantially identical with run 1 except that 0.74 (corrected) mol of BF$_3$ was added per mol of xylene. In this run, no C$_{16}$ aromatics were produced. The directional effect of the BF$_3$ on the ethylxylene distribution is shown by the fact that the desired 1,3,5-ethylxylene represents about 60% of the total ethylxylenes as against about 5% in run 1.

Run 5 shows the remarkable improvement obtained in the yield of the desired 1,3,5-ethylxylene when the amount of BF$_3$ present is sufficient to complex all the xylenes so as to form a single phase homogeneous system. This is particularly noteworthy in view of run 4 where the BF$_3$ was present in an amount only slightly under the theoretical amount; here the ethylxylenes contained about 30% of 1,3,4-ethylxylene; this effect of the single phase homogeneous system is all the more striking since the amount of ethylxylene produced was about the same in each run.

Runs 6 and 7 used a mixed xylene feed. In run 6, the paraxylene alkylated to form the 1,4,3-ethylxylene isomer. The ethylbenzene in the feed alkylated to triethylbenzene rather than to diethylbenzene. In run 7, the 1,4,3-ethylxylene resulting from the ethylation of para-xylene has been substantially completely isomerized to 1,3,5-ethylxylene; this result is believed to be primarily the effect of the single phase homogeneous system. In run 7, the high disappearance of para-xylene is due to isomerization to the meta isomer, in addition to ethylation.

Runs 9 and 10 illustrate the effect of high temperature operation on the direction of the ethylation. In runs 9 and 10, no detectable amounts of any ethylxylene isomer, other than the desired 1,3,5-isomer, were present. In run 9, 22% of the alkylate was made up of the di- and tri-ethylxylenes; in this run, slightly less than an equimolar amount of xylene and ethylene was present. However, in run 10, wherein a slight excess of xylene was present, only about 6% of the alkylate consists of the di- and triethylxylenes. These runs show the marked beneficial effect on yield of the presence of even slight amounts of excess xylene when operating at higher temperatures.

Run 11 illustrates the propylation of m-xylene. The alkylate contained 81% of isopropylxylene—all of which was, within analytical error, the 1,3,5-isopropylxylene isomer. The higher boiling fraction consisted of a wide boiling range mixture of alkylbenzenes and condensation products.

Run 12 illustrates the isobutylation of m-xylene. Herein an appreciable yield of materials believed to be polyisobutylenes was formed which is not considered in the reaction product mixture reported. The identifiable alkylate consists of the 1,3,5-tert-butylxylene. Almost an equal quantity of alkylbenzenes and condensation products were formed. A shorter time would have increased the yield of the 1,3,5-tert-butylxylene.

ILLUSTRATIVE EMBODIMENT

The accompanying drawing shows one embodiment of our process for the production of high purity 1,3,5-ethylxylene by the ethylation of meta-xylene. It is to be understood that this embodiment is shown for purposes of illustration only and that many other variations of our process can be readily devised by those skilled in the art.

In this illustration, the charge consists of substantially pure meta-xylene from a source 11. However, the charge could be a mixture of meta-xylene, para-xylene and ethylbenzene, ortho-xylene or a mixture of meta-, ortho-, para-xylene and ethylbenzene. Meta-xylene from source 11 is passed through line 12 into line 13. Liquid HF from source 14 is passed through valved line 16, through line 17, and through line 18 into line 13. The amount of liquid HF used here is 10 mols per mol based on xylene charged. BF$_3$ from source 19 is passed through valved line 21, through line 22 and into line 18 where it is commingled with the liquid HF. The amount of BF$_3$ used in this example is 1.5 mols of BF$_3$ per mol of xylene charged in order to insure the complexing of all xylene charged and the formation of a single phase homogeneous system. The liquid HF—BF$_3$ in line 18 joins the xylene in line 13 and the whole passes into mixer 23.

Mixer 23 may be any form of device that provides thorough agitation, for example, an orifice mixer. The reaction of the BF$_3$, HF and metaxylene to form the complex is exothermic and mixer 23 is provided with a cooling coil 24 to enable the temperature of the reaction mixture to be controlled.

Ethylene from source 25 is passed through valved line 26 into line 27 where it meets the homogeneous system passing out of mixer 23. The amount of ethylene used in this example is 1 mol per 2.5 mols of xylene. Reactor 28 is provided with a coil 29 which is used to maintain the temperature of the reaction mixture relatively constant. Temperature in the reactor in this example is about +20° C. The reactants are held in reactor 28 for a time sufficient to obtain ethylation and conversion of the ethylxylenes into the desired symmetrical 1,3,5-ethylxylene. In this example, the reaction time is 15 minutes.

From reactor 28, the homogeneous system is passed into line 30 and on into cooler 31. Cooler 31 is needed only when very high reaction temperatures are used; the reaction mixture is cooled quickly in order to eliminate disproportionation of the xylene.

From cooler 31, the mixture is passed through line 32 into stripper 33. In stripper 33, the HF and BF$_3$ are removed from the hydrocarbons. In order to avoid the formation of undesirable products through disproportionation and cracking, the removal of the HF and BF$_3$ is carried out under vacuum; the stripping operation is facilitated by the use of a stripping agent; butane is introduced into stripper 33 through line 34.

The HF and BF₃ are passed out of stripper 33 through line 36, through vacuum pump 37 and line 38 into condenser 39. In condenser 39, the butane and HF are liquified and are passed through line 41 into settler 42. The free BF₃ is passed out of settler 42 through lines 43 and 44 to line 22 for reuse in the process. The liquid butane is passed out of settler 42 through line 46 and may be returned to line 34 for reuse in the stripping operation. The liquid HF, saturated with BF₃, is passed out of settler 42 through valved line 47 into line 17 and may be reused in the process.

The hydrocarbons are passed out of stripper 33 through line 51 through heater 52 and line 53 into fractionator 54. Fractionator 54 is provided with a reboiler 55, which reboiler in conjunction with heater 52 provides the heat necessary to separate the hydrocarbons into the respective fractions. The unreacted xylene is taken overhead from fractionator 54 through line 56 and is condensed in cooler 57. The xylene is recycled to the reactor by way of valved line 58 and line 59 and line 12.

The ethylxylenes are withdrawn from an upper part of fractionator 54 by way of line 61 and are passed to storage not shown. The ethylxylenes in this example consist of about 95% 1,3,5-ethylxylene and the remainder the 1,3,4- and 1,3,2-ethylxylene configurations.

The higher boiling C₁₂ and any C₁₄ aromatic fraction is withdrawn from the bottom of fractionator 54 by way of line 64 and are passed to storage, not shown.

One embodiment of the process has been described wherein substantially pure meta-xylene has been the feed material. A mixture of meta-xylene, ortho-xylene and para-xylene can be used with only one variation from the above conditions. For the mixed xylene feed, a reaction time of about 2 hours is used in order to isomerize the mixed ethylxylenes to the 1,3,5-ethylxylene.

When the feed to the process contains ethylbenzene, in addition to xylenes, no change in operating conditions need be made. The ethylbenzene reacts to form triethylbenzene and ethylxylene. The triethylbenzene is passed out of the system with the higher boiling C₁₂ and C₁₄ fractions.

When no appreciable demand exists for by-product diethylxylene and triethylxylene, the process is carried out at higher temperatures. The xylene to ethylene ratio is 1:1 and reactor 28 is maintained at +65° C.; the reaction time is 8 minutes. Essentially pure 1,3,5-ethylxylene is withdrawn by way of line 61. In this method of operation, about 95% of the alkylate is the 1,3,5-ethylxylene.

Thus having described the invention, what is claimed is:

1. A process for the preparation of high purity 1,3,5-secondary alkylxylene, which alkyl group is selected from the class consisting of isopropyl and sec-butyl, which process comprises (1) contacting, under substantially anhydrous conditions, a feed consisting essentially of at least one xylene isomer with at least about 1 mol of BF₃ and between about 3 and 50 mols of liquid HF, respectively, per mol of xylene in said feed, to form an essentially single phase homogeneous system, (2) adding an olefin selected from the class consisting of propylene, butene-1 and butene-2, in a mol ratio of xylene to olefin of at least about 1, while (3) maintaining the reaction zone at a temperature of between about −20° C. and about +40° C. for a time between about 1 minute and about 2 hours, the longer times corresponding to the lower temperatures (4) covering HF and BF₃ from a hydrocarbon product and (5) recovering from said product a secondary alkylxylene fraction consisting of high purity 1,3,5-secondary alkylxylene.

2. The process of claim 1 wherein said temperature is between about 0° and +20° C. and said time is between about 5 and 60 minutes.

3. The process of claim 1 wherein said feed is p-xylene.

4. The process of claim 1 wherein said feed is o-xylene.

5. The process of claim 1 wherein said olefin is propylene.

6. The process of claim 1 wherein said olefin is butene-1.

7. The process of claim 1 wherein said olefin is butene-2.

8. The process of claim 1 wherein said olefin is a mixture of butene-1 and butene-2.

References Cited in the file of this patent

UNITED STATES PATENTS

| | | |
|---|---|---|
| 2,423,470 | Simons | July 8, 1947 |
| 2,713,600 | Langlois | July 19, 1955 |
| 2,740,819 | Kirkland | Apr. 3, 1956 |
| 2,766,307 | McCaulay et al. | Oct. 9, 1956 |